Patented Oct. 27, 1953

2,657,146

UNITED STATES PATENT OFFICE 2,657,146

BOROSILICATE OPTICAL GLASS

Norbert J. Kreidl, Brighton, N. Y., assignor to Bausch & Lomb Optical Company, Rochester, N. Y., a corporation of New York No Drawing. Application September 29, 1951, Serial No. 249,013

3 Claims. (Cl. 106—54)

This invention relates to glass compositions and more particularly it has reference to compositions of borosilicate optical glasses which are susceptible to discoloration when subjected to irradiation by high energy sources such as X-rays, gamma rays or electrons.

One of the objects of this invention is to provide a borosilicate optical glass which will be stabilized against discoloration by irradiation of high energy sources. A further object is to provide a borosilicate optical glass which will be stabilized against discoloration by irradiation while still retaining desirable optical properties. These and other objects and advantages will be apparent from the following description.

While cerium oxide has previously been used in glass batches in order to stabilize the glass against discolorations by irradiation, such uses have not, hitherto, been successful in the case of borosilicate optical glasses, such as borosilicate crowns and certain barium crowns because the desired optical properties were not maintained. In particular, the borosilicate crown glasses, which are widely used in optical systems and have a refractive index range of about 1.49–1.54 and a reciprocal relative dispersion range of 62–67.5, could not be successfully stabilized against discoloration by irradiation. Such borosilicate crown glasses contain oxides of $SiO_2$, $K_2O$, $ZnO$, $B_2O_3$ and $Sb_2O_3$.

I have discovered that unless borosilicate crown glasses are substantially free from potassium, they will not be stabilized against discoloration by irradiation even if relatively large amounts of cerium are present. While $K_2O$ should preferably be entirely absent from the batch, it must not be present in an amount greater than 0.5% by weight. The $K_2O$ may be replaced by $Na_2O$ or small amounts of $Li_2O$. If more than 2% $Li_2O$ is used, the glass has an increased tendency to devitrify.

I have also discovered that the use of CeO in typical borosilicate glasses produces objectionable crystallization or devitrification. It was found, however, that this devitrification could be prevented by adding small amounts of 0–2% each of $SrO$, $Al_2O_3$ and $BaO$ in various combinations. Since the use of $BaO$ produces a relatively minor effect towards color stabilization, a greater proportion of Sr and $Al_2O_3$ is preferred. $Sb_2O_3$ may be present in amounts not exceeding 0.5% but it is preferably omitted altogether.

It was also found that the addition of $CeO_2$ to the batch produced a slight yellow color in the glass even before the glass was irradiated by high energy sources. This slight color can be partially removed by balancing the oxidation reduction equilibrium using carbon and nitrates in an equilibrium to be established by experiment, depending upon furnace conditions.

Optical glasses embodying my invention have the following composition ranges by weight:

$SiO_2$ 60–70%, $B_2O_3$ 10–20%, $Na_2O$ 10–15%,
$ZnO$ 1–5%, $Li_2O$ 0–2%, $K_2O$ 0–0.5%,
$SrO$ 0–2%, $BaO$ 0–2%, $Al_2O_3$ 0–2%,
$Sb_2O_3$ 0–0.5%, $CeO_2$ 0.2–2%.

The refractive indices for these glasses range from about 1.49 to 1.54 and the reciprocal relative dispersions, V values, vary from about 62 to 67.5.

Some batch compositions of glasses embodying my invention are given below:

EXAMPLE

|  | I | II | III |
|---|---|---|---|
| $SiO_2$ | 67.5 | 67.5 | 67.5 |
| $Na_2O$ | 13 | 13 | 13 |
| $Li_2O$ |  |  |  |
| $K_2O$ |  |  |  |
| $SrO$ | 1 | 1 | 2 |
| $BaO$ | 2 | 1 |  |
| $Al_2O_3$ |  | 1 | 1 |
| $Sb_2O_3$ |  |  |  |
| $ZnO$ | 2.5 | 2.4 | 2.4 |
| $B_2O_3$ | 13 | 13 | 13 |
| $CeO_2$ | 1 | 1 | 1 |
| $n_D$ | 1.52 | 1.52 | 1.52 |
| V | 63.5 | 63 | 63 |

I claim:

1. A borosilicate optical glass which is stabilized against discoloration by irradiation and comprises by weight 60–70% of $SiO_2$, 10–20% of $B_2O_3$, 1–5% of $ZnO$, 10–15% of $Na_2O$, 0.2–2% of $CeO_2$, and not over 2% each of $SrO$ and $Al_2O_3$.

2. A borosilicate optical glass which is substantially free from potassium and is stabilized against discoloration by irradiation and comprising by weight 60–70% of $SiO_2$, 10–20% of $B_2O_3$, 1–5% of $ZnO$, 10–15% of $Na_2O$, 0.2–2% of $CeO_2$, and not over 2% each of $SrO$ and $BaO$.

3. A borosilicate optical glass stabilized against discoloration by irradiation and comprising by weight 60–70% of $SiO_2$, 10–20% of $B_2O_3$, 1–5% of $ZnO$, 10–15% of $Na_2O$, 0.2–2% of $CeO_2$ and $SrO$, $BaO$ and $Al_2O_3$ each in amounts of not over 2%.

NORBERT J. KREIDL.

References Cited in the file of this patent

UNITED STATES PATENTS

| Number | Name | Date |
|---|---|---|
| 2,068,801 | Hood | Jan. 26, 1937 |
| 2,564,950 | Black | Aug. 21, 1951 |

FOREIGN PATENTS

| Number | Country | Date |
|---|---|---|
| 617,148 | Germany | 1936 |